(12) United States Patent
Nakagoshi et al.

(10) Patent No.: US 11,008,918 B2
(45) Date of Patent: May 18, 2021

(54) EXHAUST GAS PURIFICATION APPARATUS FOR AN INTERNAL COMBUSTION ENGINE

(71) Applicant: TOYOTA JIDOSHA KABUSHIKI KAISHA, Aichi-ken (JP)

(72) Inventors: Shinichi Nakagoshi, Miyoshi (JP); Hiromasa Hashimoto, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/291,670

(22) Filed: Mar. 4, 2019

(65) Prior Publication Data

US 2019/0271249 A1     Sep. 5, 2019

(30) Foreign Application Priority Data

Mar. 5, 2018    (JP) .............................. JP2018-038633

(51) Int. Cl.
*F01N 3/08*     (2006.01)
*F01N 11/00*    (2006.01)
(Continued)

(52) U.S. Cl.
CPC ......... *F01N 3/208* (2013.01); *B01D 53/9418* (2013.01); *B01D 53/9445* (2013.01);
(Continued)

(58) Field of Classification Search
CPC .... F01N 3/208; F01N 3/105; F01N 2560/026; F01N 2610/02; F01N 2900/1624;
(Continued)

(56) References Cited

U.S. PATENT DOCUMENTS 6,666,020 B2 * 12/2003 Tonetti ................ F02D 41/1448
                                              60/286
6,761,024 B2 *  7/2004 Uchida ................. F01N 11/007
                                              60/277
(Continued)

FOREIGN PATENT DOCUMENTS

JP      2003166412 A      6/2003
JP      2005-264808 A     9/2005
(Continued)

OTHER PUBLICATIONS

Unpublished U.S. Appl. No. 16/291,692, filed Mar. 4, 2019.
(Continued)

*Primary Examiner* — David Hamaoui
(74) *Attorney, Agent, or Firm* — Hauptman Ham, LLP

(57) ABSTRACT

An exhaust gas purification apparatus for an internal combustion engine includes a particulate filter, an air fuel ratio sensor to detect an air fuel ratio of exhaust gas at the downstream side of the filter, and a controller configured to: change an air fuel ratio, determine whether an amount of particulate matter (PM) deposited in an interior of a partition wall of the filter is equal to or smaller than a predetermined amount, and estimate a maximum storable oxygen amount of the catalyst from a change of the air fuel ratio of exhaust gas at the time when the air fuel ratio of the exhaust gas is changed, in cases where the amount of PM deposited in the interior of the partition wall of the filter is equal to or smaller than the predetermined amount.

15 Claims, 9 Drawing Sheets

(51) Int. Cl.
*F01N 3/20* (2006.01)
*B01D 53/94* (2006.01)
*F01N 3/10* (2006.01)

(52) U.S. Cl.
CPC ........ *F01N 3/105* (2013.01); *B01D 2255/908* (2013.01); *B01D 2255/9155* (2013.01); *B01D 2258/01* (2013.01); *F01N 2560/026* (2013.01); *F01N 2610/02* (2013.01)

(58) Field of Classification Search
CPC ........... F01N 2430/06; F01N 2560/025; F01N 2560/14; F01N 2900/1606; F01N 3/0864; F01N 3/035; F01N 3/021; F01N 11/00; F01N 11/002; B01D 53/9445; B01D 53/9418; B01D 2255/9155; B01D 2258/01; B01D 2255/908
See application file for complete search history.

(56) References Cited

U.S. PATENT DOCUMENTS

| | | | |
|---|---|---|---|
| 6,915,628 B2* | 7/2005 | Kamoto | F01N 3/101 60/274 |
| 7,263,825 B1* | 9/2007 | Wills | F01N 9/002 55/DIG. 30 |
| 7,698,886 B2* | 4/2010 | Aoki | F01N 3/0807 60/274 |
| 8,516,799 B2 | 8/2013 | Hepburn et al. | |
| 9,151,206 B2* | 10/2015 | Van Nieuwstadt | F01N 3/101 |
| 9,835,069 B2* | 12/2017 | Hagimoto | B01D 46/0027 |
| 10,119,448 B2* | 11/2018 | Kidokoro | B01D 46/0027 |
| 10,794,249 B2* | 10/2020 | Kaneko | F01N 3/023 |
| 2008/0229730 A1 | 9/2008 | Ishibashi | |
| 2012/0000184 A1* | 1/2012 | Ardanese | F01N 11/002 60/274 |
| 2013/0031892 A1 | 2/2013 | Nagaoka et al. | |
| 2016/0376972 A1* | 12/2016 | Hagimoto | F01N 9/002 60/276 |
| 2017/0145893 A1* | 5/2017 | Kidokoro | F01N 11/00 |
| 2017/0152784 A1 | 6/2017 | Kidokoro et al. | |
| 2017/0175605 A1 | 6/2017 | Hagimoto et al. | |
| 2019/0168161 A1* | 6/2019 | Cravillon | F01N 3/035 |
| 2019/0271250 A1* | 9/2019 | Hashimoto | B01D 53/9418 |
| 2019/0284977 A1* | 9/2019 | Kaneko | F01N 9/002 |

FOREIGN PATENT DOCUMENTS

| | | |
|---|---|---|
| JP | 2005264807 A | 9/2005 |
| JP | 2017-96192 A | 6/2017 |
| JP | 2017-96240 A | 6/2017 |
| JP | 2017-96241 A | 6/2017 |
| JP | 2017-110547 A | 6/2017 |
| JP | 2017-110592 A | 6/2017 |
| JP | 2017-110594 A | 6/2017 |
| JP | 2017-110596 A | 6/2017 |
| JP | 2017-115805 A | 6/2017 |
| JP | 2017-115810 A | 6/2017 |

OTHER PUBLICATIONS

Office Action in U.S. Appl. No. 16/291,692, dated Apr. 6, 2020, 17pp.
Office Action in U.S. Appl. No. 16/291,692, dated Sep. 17, 2020, 17pp.
Notice of Allowance in U.S. Appl. No. 16/291,692, dated Mar. 12, 2021, 12pp.

* cited by examiner

EXHAUST GAS PURIFICATION APPARATUS FOR AN INTERNAL COMBUSTION ENGINE

CROSS REFERENCE TO RELATED APPLICATION

This application claims the benefit of Japanese Patent Application No. 2018-038633, filed on Mar. 5, 2018, which is hereby incorporated by reference herein in its entirety.

BACKGROUND

Technical Field

The present disclosure relates to an exhaust gas purification apparatus for an internal combustion engine.

Description of the Related Art

There has been known that a particulate filter (hereinafter, simply referred to as "a filter") with a catalyst having an oxygen storage capacity supported thereon is arranged in an exhaust passage of an internal combustion engine. When this catalyst deteriorates, a maximum amount of oxygen storable in the catalyst (hereinafter, also referred to as a maximum storable oxygen amount) decreases, as a result of which the deterioration of the catalyst can be determined based on the maximum storable oxygen amount. Here, there has been known a technology in which the maximum storable oxygen amount is corrected based on an amount of particulate matter (hereinafter, also referred to as PM) deposited on the filter and the temperature of the filter, and deterioration determination of the filter is made based on the maximum storable oxygen amount after correction (for example, refer to patent literature 1).

At the time of the deterioration determination of the catalyst, the air fuel ratio of exhaust gas flowing into the catalyst is controlled to change from a rich side to a lean side or from a lean side to a rich side across a stoichiometric air fuel ratio. For example, when the air fuel ratio of the exhaust gas flowing into the catalyst changes from an air fuel ratio larger than the stoichiometric air fuel ratio to an air fuel ratio smaller than the stoichiometric air fuel ratio, the oxygen stored in the catalyst is released. Then, while this release of oxygen is carried out, the air fuel ratio of the exhaust gas detected at the downstream side of the catalyst becomes constant in the vicinity of the stoichiometric air fuel ratio. A period of time in which this air fuel ratio of the exhaust gas is in the vicinity of the stoichiometric air fuel ratio relates to the maximum storable oxygen amount in the catalyst, so that the maximum storable oxygen amount can be obtained based on this period of time. However, when the oxygen released from the catalyst is consumed by reacting with the PM deposited on the filter, the period of time in which the air fuel ratio of the exhaust gas detected at the downstream side of the catalyst becomes constant in the vicinity of the stoichiometric air fuel ratio becomes short. In that case, an incorrect determination may be made that the oxygen storage capacity has been low, and hence, in the patent literature 1, a correction to add a storage amount of oxygen to be consumed by the PM to the maximum storable oxygen amount is carried out.

CITATION LIST

Patent Literature

Patent Literature: Japanese patent application laid-open publication No. 2005-264808

SUMMARY

In the patent literature 1, there is described a problem that the maximum storable oxygen amount is calculated to be less than an actual amount due to the PM, but it has been newly found that the maximum storable oxygen amount changes according to the deposition location of the PM. Accordingly, when the maximum storable oxygen amount is corrected as in the past, there is a fear that an incorrect determination may occur in the deterioration determination of the catalyst.

The present disclosure has been made in view of the problem as mentioned above, and the object of the disclosure is to estimate an oxygen storage capacity of a catalyst supported by a filter at a high degree of accuracy.

Solution to Problem

In order to solve the above-mentioned problem, according to one aspect of the present disclosure, there is provided an exhaust gas purification apparatus for an internal combustion engine comprising: a particulate filter that is arranged in an exhaust passage of the internal combustion engine, and supports a catalyst having an oxygen storage capacity; an air fuel ratio sensor configured to detect an air fuel ratio of exhaust gas at the downstream side of said particulate filter; and a controller configured to: change an air fuel ratio of exhaust gas flowing into said particulate filter; determine whether an amount of particulate matter deposited in an interior of a partition wall of said particulate filter is equal to or smaller than a predetermined amount; and estimate a maximum storable oxygen amount of said catalyst from a change of the air fuel ratio of exhaust gas obtained by said air fuel ratio sensor at the time when the air fuel ratio of the exhaust gas is changed by said controller, in cases where the amount of particulate matter deposited in the interior of the partition wall of said particulate filter is equal to or smaller than the predetermined amount.

The maximum storable oxygen amount of the catalyst can be obtained based on the change of the air fuel ratio of the exhaust gas at the downstream side of the catalyst at the time when the air fuel ratio of the exhaust gas flowing into the catalyst is made to change. However, it has been found that the maximum storable oxygen amount is influenced according to a location at which the PM is deposited. That is, it has become clear that in the filter supporting the catalyst, the maximum storable oxygen amount changes according to an amount of PM deposited in the interior of the partition wall of the filter (i.e., deposited in the inside or interior of pores formed in the partition wall), but does not change according to an amount of PM deposited on a surface of the partition wall of the filter (i.e., deposited on the outside of the pores formed in the partition wall). Accordingly, even if the degree of deterioration of the catalyst is the same, the maximum storable oxygen amount may change with the location at which the PM is deposited. For this reason, when the deterioration determination of the catalyst is carried out, for example, based on the maximum storable oxygen amount, there is a fear that an incorrect determination may occur. Accordingly, the controller estimates the maximum storable oxygen amount of the catalyst, in cases where the amount of particulate matter deposited in the interior of the partition wall of the filter is equal to or smaller than the predetermined amount. This predetermined amount is an amount of PM deposited in the interior of the partition wall which does not affect a calculated value of the maximum storable oxygen amount, and is a sufficiently small amount of PM deposited in the interior of the partition wall. The predetermined amount may also be 0, for example. Here, note that the amount of PM deposited in the interior of the partition wall may become 0 by carrying out regeneration of the filter. If the amount of PM deposited in the interior of the partition wall of the filter is sufficiently small, it will be possible to estimate the maximum storable oxygen amount which has not been affected by the influence of the PM, and hence, for example, the oxygen storage capacity at the time of carrying out the deterioration determination of the catalyst by comparing the maximum storable oxygen amount with a threshold value can be estimated with a high degree of accuracy.

In addition, said controller can determine whether the particulate matter deposited in said particulate filter has been oxidized, and determine whether the amount of the particulate matter deposited in the interior of the partition wall of said particulate filter is equal to or smaller than the predetermined amount, after it is determined by said controller that the particulate matter has been oxidized.

The PM deposited in the filter is oxidized and removed from the filter in cases where the temperature of the filter is sufficiently high and oxygen is present. This is referred to as the regeneration of the filter. Hereinafter, a temperature at which the PM is oxidized is also referred to as a "PM oxidation temperature". The regeneration of the filter can also be carried out actively by carrying out the processing of raising the temperature of the filter and the processing of increasing the oxygen concentration of exhaust gas, or in cases where fuel cut-off is carried out for example when the temperature of the filter goes up to the PM oxidation temperature, the regeneration of the filter may be carried out in the course of nature. In addition, in cases where the regeneration of the filter is carried out, all the PM may be removed from the interior of the partition wall of the filter, or in cases where a period of time in which the regeneration of the filter has been carried out is not sufficient, the PM may remain in the interior of the partition wall of the filter. Accordingly, after the regeneration of the filter is carried out, it is determined whether the amount of the PM deposited in the interior of the partition wall of the filter is equal to or smaller than the predetermined amount, and in cases where it is determined that the amount of the PM deposited in the interior of the partition wall of the filter is equal to or smaller than the predetermined amount, the oxygen storage capacity of the catalyst can be estimated with a high degree of accuracy, by obtaining the maximum storable oxygen amount.

In addition, provision is further made for a differential pressure sensor configured to detect a difference between pressures of exhaust gas at the upstream side and at the downstream side of said particulate filter, wherein said controller can calculate the amount of the particulate matter deposited in the interior of the partition wall of said particulate filter based on the pressure difference detected by said differential pressure sensor.

When the PM is deposited in the filter, it is first deposited mainly in the interior of the partition wall, and after that, is deposited on the surface of the partition wall. Thus, in the process in which the PM is deposited in the filter, the difference between the pressures of exhaust gas at the upstream side and at the downstream side of the particulate filter increases gradually. In other words, the amount of PM deposited in the interior of the partition wall of the filter and said pressure difference are in correlation with each other, so the amount of the PM deposited in the interior of the partition wall of the filter can be calculated based on said pressure difference.

According to the present disclosure, an oxygen storage capacity of a catalyst supported by a filter can be estimated with a high degree of accuracy.

DESCRIPTION OF THE EMBODIMENTS

Hereinafter, a mode for carrying out the present disclosure will be described in detail by way of example based on a preferred embodiment thereof with reference to the attached drawings. However, the dimensions, materials, shapes, relative arrangements and so on of component parts described in the embodiment are not intended to limit the scope of the present disclosure to these alone in particular as long as there are no specific statements.

Embodiment

Figure 1:
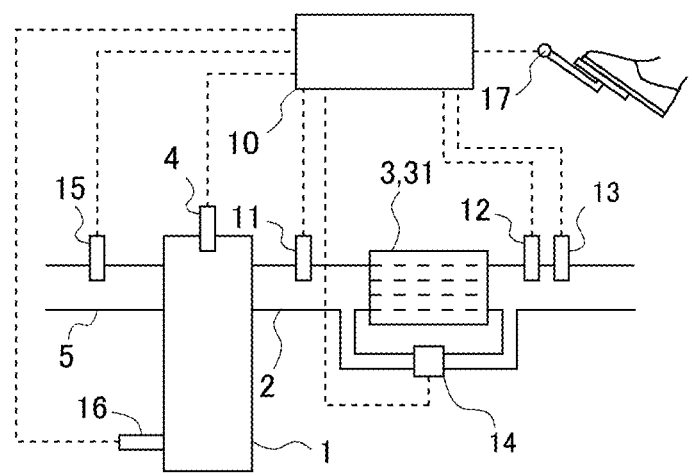
FIG. 1 is a view showing the schematic construction of an intake system and an exhaust system of an internal combustion engine according to an embodiment of the present disclosure.

FIG. 1 is a view showing the schematic construction of an intake system and an exhaust system of an internal combustion engine 1 according to an embodiment of the present disclosure. The internal combustion engine 1 is a gasoline engine for driving a vehicle. However, the internal combustion engine 1 may also be a diesel engine. An exhaust passage 2 is connected to the internal combustion engine 1. A particulate filter 3 (hereinafter, simply referred to as a "filter 3") supporting a three-way catalyst 31 is arranged in the exhaust passage 2. The filter 3 is a wall flow type filter to trap particulate matter (PM) in exhaust gas, wherein when the exhaust gas passes through pores formed in a partition wall of the filter 3, the PM in the exhaust gas is trapped.

The three-way catalyst 31 has an oxygen storage capacity, and serves to purify or remove NOx, HC and CO at the time when a catalytic atmosphere is at a stoichiometric air fuel ratio. The three-way catalyst 31 can maintain the catalytic atmosphere substantially at the stoichiometric air fuel ratio, by storing oxygen when the air fuel ratio of exhaust gas flowing thereinto (or inflow exhaust gas) is a lean air fuel ratio which is an air fuel ratio larger than the stoichiometric air fuel ratio, and releasing oxygen when the air fuel ratio of the inflow exhaust gas is a rich air fuel ratio which is an air fuel ratio smaller than the stoichiometric air fuel ratio. By the action of such an oxygen storage capacity, the three-way catalyst 31 can remove HC, CO and NOx, because even if the air fuel ratio of the exhaust gas flowing into the three-way catalyst 31 is other than the stoichiometric air fuel ratio, the catalytic atmosphere becomes the stoichiometric air fuel ratio. Here, note that in this embodiment, the three-way catalyst 31 corresponds to a catalyst in the present disclosure. The catalyst in the present disclosure needs only to have the oxygen storage capacity, so a catalyst having an oxygen storage capacity other than the three-way catalyst 31 can also be used.

A first air fuel ratio sensor 11 for detecting the air fuel ratio of exhaust gas is mounted on the exhaust passage 2 at the upstream side of the three-way catalyst 31. In addition, a second air fuel ratio sensor 12 for detecting the air fuel ratio of exhaust gas and a temperature sensor 13 for detecting the temperature of exhaust gas are mounted on the exhaust passage 2 at the downstream side of the three-way catalyst 31. Here, note that the first air fuel ratio sensor 11 and the second air fuel ratio sensor 12 may be limiting current type oxygen concentration sensors, for example, or may be electromotive force type (concentration cell type) oxygen concentration sensors ($O_2$ sensors), for example. Each of the limiting current type oxygen concentration sensors outputs a voltage corresponding to an air fuel ratio over a wide air fuel ratio range. On the other hand, each of the electromotive force type (concentration cell type) oxygen concentration sensors outputs a voltage which changes suddenly at the stoichiometric air fuel ratio. Here, note that in this embodiment, the second air fuel ratio sensor 12 corresponds to an air fuel ratio sensor in the present disclosure. Moreover, in the exhaust passage 2, there is arranged a differential pressure sensor 14 which serves to detect a difference between the pressure of exhaust gas at the upstream side of the filter 3 and the pressure of exhaust gas at the downstream side of the filter 3. Here, note that in this embodiment, the differential pressure sensor 14 corresponds to a differential pressure sensor in the present disclosure.

In addition, a fuel injection valve 4 for each cylinder for injecting fuel into a corresponding cylinder is mounted on the internal combustion engine 1. Moreover, an intake passage 5 is connected to the internal combustion engine 1. An air flow meter 15 for detecting the flow rate of intake air is mounted on the intake passage 5.

Then, an electronic control unit (ECU) 10 is provided in combination with the internal combustion engine 1. The ECU 10 controls the operating state of the internal combustion engine 1, an exhaust gas purification apparatus, and so on. A crank position sensor 16 and an accelerator opening sensor 17, in addition to the first air fuel ratio sensor 11, the second air fuel ratio sensor 12, the differential pressure sensor 14 and the air flow meter 15 as referred to above, are electrically connected to the ECU 10, so that the detected values of these individual sensors are passed or transmitted to the ECU 10.

The ECU 10 is able to grasp the operating state of the internal combustion engine 1, such as the engine rotation speed based on the detection of the crank position sensor 16, the engine load based on the detection of the accelerator opening sensor 17, etc. Here, in this embodiment, the air fuel ratio of the exhaust gas flowing into the three-way catalyst 31 is able to be detected by the first air fuel ratio sensor 11, but it is also possible to estimate the air fuel ratio of the exhaust gas based on the amount of intake air detected by the air flow meter 15 and the amount of fuel injected from each injection valve 4. In addition, the ECU 10 is able to detect the temperature of the filter 3 and the temperature of the three-way catalyst 31 based on the temperature of the exhaust gas detected by the temperature sensor 13. Here, note that the filter 3 and the three-way catalyst 31 are formed integrally with each other, so the temperature of the filter 3 and the temperature of the three-way catalyst 31 are equal to each other. Moreover, the temperature detected by the temperature sensor 13 may also be used as the temperature of the filter 3 and the temperature of the three-way catalyst 31. The ECU 10 is also able to estimate the temperature of the filter 3 and the temperature of the three-way catalyst 31 based on the operating state of the internal combustion engine 1. Further, the detected value of the differential pressure sensor 14, and the amount of PM deposition in the filter 3 have relation with each other, so that the ECU 10 can detect the amount of PM deposition in the filter 3 based on the detected value of the differential pressure sensor 14. The relation between the detected value of the differential pressure sensor 14 and the amount of PM deposition in the filter 3 has been obtained in advance by experiments, simulations, or the like. In addition, the amount of PM deposition in the filter 3 can also be estimated by the ECU 10 in the following manner. An amount of the PM trapped in the filter 3 per unit time and an amount of the PM oxidized in the filter 3 per unit time have a relation with the temperature of the filter 3, the operating state of the internal combustion engine 1, etc., and hence, the amount of the PM trapped in the filter 3 per unit time and the amount of the PM oxidized in the filter 3 per unit time can be estimated from the temperature of the filter 3, the operating state of the internal combustion engine 1, etc. Then, the amount of PM deposition in the filter 3 at the current point of time can be estimated by integrating a value which is obtained by subtracting the amount of the PM oxidized in the filter 3 per unit time from the amount of the PM trapped in the filter 3 per unit time.

Moreover, the ECU 10 carries out a deterioration determination as to whether the three-way catalyst 31 has deteriorated. In cases where a maximum oxygen storage amount of the three-way catalyst 31 becomes lower than a lower limit value, the ECU 10 makes a determination that the three-way catalyst 31 has deteriorated. Here, the deterioration referred to herein is thermal deterioration which can not be recovered, etc. In this embodiment, the maximum storable oxygen amount of the three-way catalyst 31 is obtained by using a Cmax method, and the deterioration determination of the three-way catalyst 31 is carried out by making a comparison between this maximum storable oxygen amount and the lower limit value. Here, the maximum storable oxygen amount of the three-way catalyst 31 is related to a period of time and an air fuel ratio of exhaust gas, from the time when the air fuel ratio of the exhaust gas flowing into the three-way catalyst 31 has changed from a rich air fuel ratio to a lean air fuel ratio until the time when the air fuel ratio of the exhaust gas flowing out of the three-way catalyst 31 changes to a lean air fuel ratio. Similarly, the maximum storable oxygen amount of the three-way catalyst 31 is also related to a period of time and an air fuel ratio of exhaust gas, from the time when the air fuel ratio of the exhaust gas flowing into the three-way catalyst 31 has changed from a lean air fuel ratio to a rich air fuel ratio until the time when the air fuel ratio of the exhaust gas flowing out of the three-way catalyst 31 changes to a rich air fuel ratio. Accordingly, the maximum storable oxygen amount of the three-way catalyst 31 can be calculated based on these periods of time and air fuel ratios.

Figure 2:
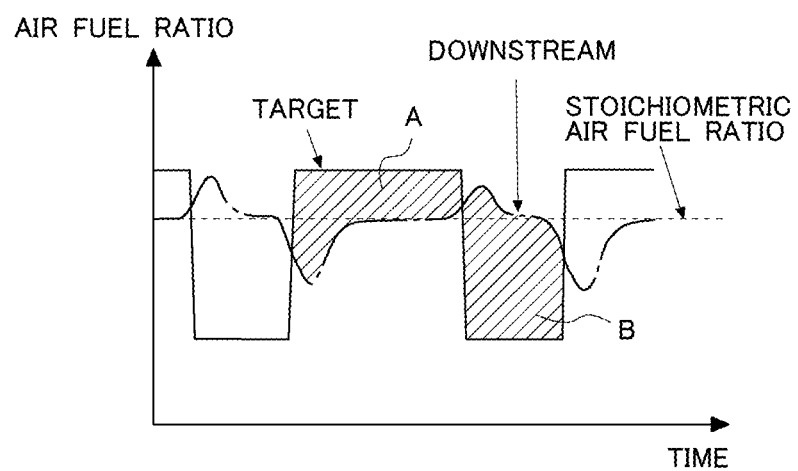
FIG. 2 is a view showing the changes over time of a target air fuel ratio (a solid line) and an air fuel ratio at the downstream side of a three-way catalyst (an alternate long and short dash line).

For example, the maximum storable oxygen amount can be calculated according to the Cmax method, as shown in FIG. 2. FIG. 2 is a view showing the changes over time of a target air fuel ratio (a solid line) and an air fuel ratio at the downstream side of the three-way catalyst 31 (an alternate long and short dash line). The target air fuel ratio is a target air fuel ratio in a cylinder of the internal combustion engine 1. Here, note that the target air fuel ratio may also be replaced with an air fuel ratio of the exhaust gas at the upstream side of the three-way catalyst 31. When the maximum storable oxygen amount is calculated according to the Cmax method, active control is carried out which is to cause the target air fuel ratio to vary across the stoichiometric air fuel ratio. Here, note that in this embodiment, the ECU 10 functions as a controller in the present disclosure, by carrying out the active control. In the active control, when the air fuel ratio of the exhaust gas at the downstream side of the three-way catalyst 31, i.e., the air fuel ratio detected by the second air fuel ratio sensor 12, changes from a rich air fuel ratio to a lean air fuel ratio, the target air fuel ratio is switched to a rich air fuel ratio, whereas when the air fuel ratio detected by the second air fuel ratio sensor 12 changes from a lean air fuel ratio to a rich air fuel ratio, the target air fuel ratio is changed to a lean air fuel ratio. The ECU 10 adjusts the amount of fuel injected from each injection valve 4 so that the actual air fuel ratio in each cylinder becomes close to the target air fuel ratio. Here, note that in the case where the second air fuel ratio sensor 12 is an electromotive force type (concentration cell type) oxygen concentration sensor ($O_2$ sensor), the target air fuel ratio is switched from a lean air fuel ratio to a rich air fuel ratio, immediately after the air fuel ratio detected by the second air fuel ratio sensor 12 has changed from a rich air fuel ratio to a lean air fuel ratio. On the other hand, in the case where the second air fuel ratio sensor 12 is a limiting current type oxygen concentration sensor, the target air fuel ratio may be switched at the time when the air fuel ratio detected by the second air fuel ratio sensor 12 becomes a predetermined lean air fuel ratio. That is, even if the detected air fuel ratio becomes a lean air fuel ratio, the target air fuel ratio is not soon switched to a rich air fuel ratio, but the target air fuel ratio may be switched after the detected air fuel ratio has been maintained in a lean air fuel ratio state. This is because even in cases where oxygen is released from the three-way catalyst 31, the air fuel ratio of the exhaust gas flowing out of the three-way catalyst 31 may deviate strictly from the stoichiometric air fuel ratio, and so, in such a case, the air fuel ratio should not be switched.

In FIG. 2, the area of a range (hatched range) surrounded by a line indicating the target air fuel ratio and a line indicating the air fuel ratio at the downstream side of the three-way catalyst 31 is proportional to the maximum storable oxygen amount of the three-way catalyst 31. Accordingly, if the relation between this area and the maximum storable oxygen amount has been obtained in advance through experiments, simulations, or the like, it is possible to obtain the maximum storable oxygen amount based on this area. Based on an area A of the range at the time when the target air fuel ratio is a lean air fuel ratio, the maximum storable oxygen amount may be obtained, or based on an area B of the range at the time when the target air fuel ratio is a rich air fuel ratio, the maximum storable oxygen amount may also be obtained, or based on an average value between the area A at the time of the target air fuel ratio being a lean air fuel ratio and the area B at the time of the target air fuel ratio being a rich air fuel ratio, the maximum storable oxygen amount may also be obtained. Here, note that in this embodiment, the maximum storable oxygen amount is obtained by using the Cmax method, but instead of this, the maximum storable oxygen amount can be obtained by adopting a well-known technique based on the change of the air fuel ratio of the exhaust gas at the downstream side of the catalyst 31 at the time when the air fuel ratio of the exhaust gas flowing into the catalyst 31 is made to change.

Figure 3:
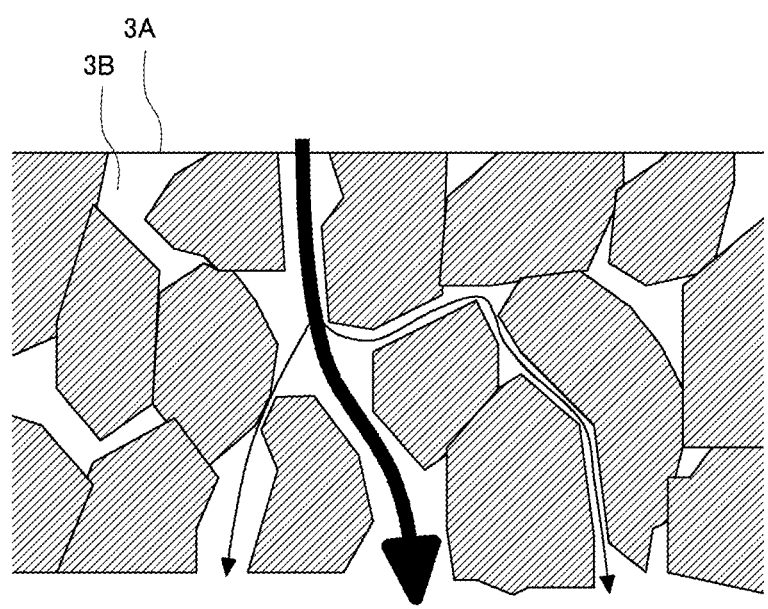
FIG. 3 shows a flow of exhaust gas passing through a filter in cases where PM is not deposited in the filter.
Figure 4:
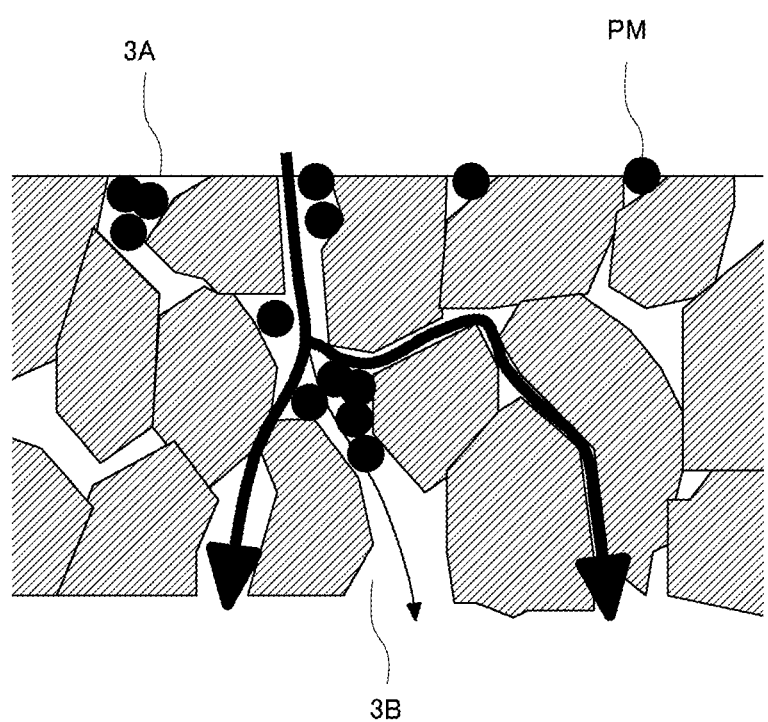
FIG. 4 shows a flow of exhaust gas during the course where PM is being deposited into an interior of a partition wall of the filter.
Figure 5:
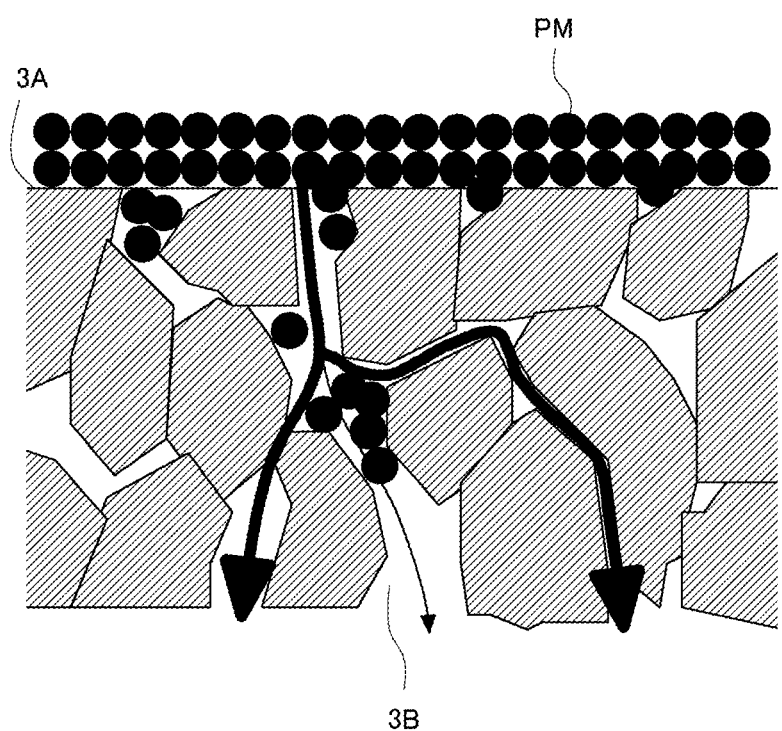
FIG. 5 shows a flow of exhaust gas during the course where PM is being deposited on a surface of the partition wall of the filter after the deposition of the PM into the interior of the partition wall of the filter ends.

The maximum storable oxygen amount obtained in the above-mentioned manner is affected by how PM has deposited in the filter 3. FIG. 3 shows a flow of exhaust gas passing through the filter 3 in the case where PM has not been deposited on the filter 3. FIG. 4 shows a flow of exhaust gas during the course where PM is being deposited in an inside or interior 3B of the partition wall of the filter 3. FIG. 5 shows a flow of exhaust gas during the course where PM is being deposited on a surface 3A of the partition wall of the filter 3 after the deposition of the PM into the interior 3B of the partition wall of the filter 3 ends. In FIG. 3, FIG. 4 and FIG. 5, the flow of an exhaust gas is represented by arrows, and the flow rate of the exhaust gas is represented by the thickness of each arrow. As shown in FIG. 3, in a state where PM has not been deposited in the filter 3, the exhaust gas is easy to pass through the filter 3 at locations at which the diameters of pores are large. In this case, the PM contained in the exhaust gas also flows through the locations where the diameters of pores are relatively large, so the PM is easy to be trapped in these locations where the diameters of pores are relatively large. At this time, oxygen is stored in the locations where the diameters of pores are relatively large.

Then, when the PM is trapped and deposited in the locations where the diameters of pores are relatively large, the exhaust gas become difficult to pass through the locations where the diameters of pores are relatively large, and a larger amount of exhaust gas becomes easy to flow through locations where the diameters of pores are relatively small, as shown in FIG. 4. For that reason, the PM comes to be trapped and deposited in the locations where the diameters of pores are relatively small. At this time, oxygen is stored in the locations where the diameters of pores are relatively small. Here, it has become clear that in cases where the PM is deposited in the filter 3, first of all, the PM is deposited mainly in the interior 3B of the partition wall, as shown in FIG. 4, and thereafter, the PM is deposited mainly on the surface 3A of the partition wall, as shown in FIG. 5. Even if the PM has been deposited on the surface 3A of the partition wall of the filter 3, there have been almost no changes to the flow of the exhaust gas in the interior 3B of the partition wall, as shown in FIG. 5. Accordingly, at this time, oxygen is stored in the locations where the diameters of pores are relatively small.

The PM deposited on the surface 3A of the partition wall and in the interior 3B of the partition wall of the filter 3 is oxidized and removed in a high temperature state (e.g., not less than 500 degrees C.) and in a state where oxygen exists in the exhaust gas. For example, at the time of a high load operation of the internal combustion engine 1, the filter 3 becomes the high temperature state. Then, after that, for example, when fuel cut-off is carried out, or when the internal combustion engine 1 is operated at a lean air fuel ratio, oxygen becomes present in the exhaust gas in a high temperature state, so that the PM deposited in the filter 3 is oxidized. It has become clear that when the PM deposited in the filter 3 is oxidized, first of all, oxidation begins mainly from the PM deposited in the interior 3B of the partition wall, and after the PM deposited in the interior 3B of the partition wall is removed, the PM deposited mainly on the surface 3A of the partition wall is oxidized.

The storage of oxygen into the three-way catalyst 31 is carried out when oxygen contacts storage sites of the three-way catalyst 31. For this reason, when there occurs a state where oxygen contacts a larger number of storage sites, the maximum storable oxygen amount becomes larger. Here, when PM is deposited in the interior 3B of the partition wall of the filter 3 so that the flow of the exhaust gas in the interior 3B of the partition wall changes to pass through the locations in which the diameters of pores are smaller, the exhaust gas will come to flow through the interior 3B of the partition wall in a wider range thereof, and hence, the storage sites in contact with oxygen increase more. Accordingly, the maximum storable oxygen amount increases as the PM is deposited in the interior 3B of the partition wall of the filter 3. Then, when a certain amount of PM is deposited in the interior 3B of the partition wall of the filter 3 so that PM becomes unable to be trapped in the interior 3B of the partition wall, the PM will be deposited on the surface 3A of the partition wall of the filter 3. Even if the PM is deposited on the surface 3A of the partition wall of the filter 3, the flow of the exhaust gas in the interior 3B of the partition wall of the filter 3 does not substantially change, so the number of the storage sites in contact with oxygen does not substantially change, either. Accordingly, even if the amount of PM deposition increases on the surface 3A of the partition wall of the filter 3, the maximum storable oxygen amount does not substantially change.

Further, it has become clear that in cases where the PM deposited in the filter 3 is oxidized, first of all, it is oxidized mainly from the PM deposited in the interior 3B of the partition wall of the filter 3. As the PM is removed from the interior 3B of the partition wall, the exhaust gas comes to flow through those locations in which the diameters of pores are larger, so the opportunity for oxygen to contact the storage sites decreases. For that reason, the maximum storable oxygen amount becomes smaller according to the decreasing amount of PM deposition. In addition, after the PM deposited in the interior 3B of the partition wall of the filter 3 is removed, the PM deposited on the surface 3A of the partition wall is oxidized. Even if the PM deposited on the surface 3A of the partition wall of the filter 3 decreases, there have been almost no changes to the flow of the exhaust gas in the interior 3B of the partition wall of the filter 3, so the maximum storable oxygen amount does not substantially change.

Figure 6:
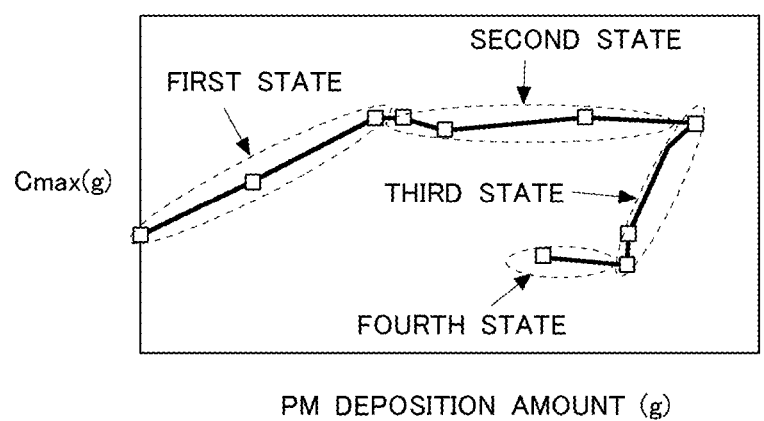
FIG. 6 is a view showing a relation between an amount of PM deposited in the filter and a maximum storable oxygen amount obtained by a Cmax method.

In this manner, the maximum storable oxygen amount may change with the locations in which the PM is deposited in the filter 3. FIG. 6 is a view showing a relation between the amount of PM deposited in the filter 3 and the maximum storable oxygen amount obtained by the Cmax method. A "first state" in FIG. 6 shows a relation between the amount of PM deposition and the maximum storable oxygen amount at the time when PM is in the course of being trapped mainly in the interior 3B of the partition wall of the filter 3, and when the amount of PM deposition in the interior 3B of the partition wall of the filter 3 is in an increasing state. A "second state" in FIG. 6 shows a relation between the amount of PM deposition and the maximum storable oxygen amount at the time when PM is in the course of being trapped mainly on the surface 3A of the partition wall of the filter 3, and when the amount of PM deposition on the surface 3A of the partition wall of the filter 3 is in an increasing state. A "third state" in FIG. 6 shows a relation between the amount of PM deposition and the maximum storable oxygen amount at the time when PM is in the course of being removed mainly from the interior 3B of the partition wall of the filter 3, and when the amount of PM deposition in the interior 3B of the partition wall of the filter 3 is in a decreasing state. A "fourth state" in FIG. 6 shows a relation between the amount of PM deposition and the maximum storable oxygen amount at the time when PM is in the course of being removed mainly from the surface 3A of the partition wall of the filter 3, and when the amount of PM deposition on the surface 3A of the partition wall of the filter 3 is in a decreasing state. As mentioned above, in the first state, the maximum storable oxygen amount increases according to the increasing amount of PM deposition, whereas in the second state, the maximum storable oxygen amount does not substantially change even with an increase in the amount of PM deposition. In addition, in the third state, the maximum storable oxygen amount decreases according to the decreasing amount of PM deposition, whereas in the fourth state, the maximum storable oxygen amount does not substantially change even with a decrease in the amount of PM deposition.

In this manner, the maximum storable oxygen amount obtained by the Cmax method changes with the deposition locations of the PM in the interior 3B of the partition wall of the filter 3, so in cases where deterioration of the three-way catalyst 31 is determined based on a comparison between the maximum storable oxygen amount and the lower limit value, there is a fear that an incorrect determination may occur. Accordingly, the ECU 10 obtains the maximum storable oxygen amount according to the Cmax method when the PM deposited in the interior 3B of the partition wall of the filter 3 is sufficiently small. In this manner, the maximum storable oxygen amount can be calculated, without being affected by the influence of the deposition of the PM. Then, the deterioration determination of the three-way catalyst 31 can be carried out, while eliminating the influence of the locations in which the PM has been deposited, by carrying out the deterioration determination of the three-way catalyst 31 with a comparison between this maximum storable oxygen amount and the lower limit value. As a result of this, the accuracy of the deterioration determination can be improved.

Figure 7:
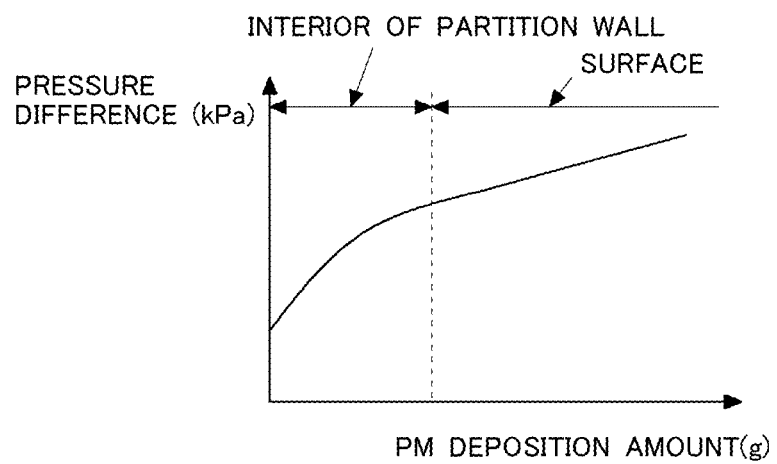
FIG. 7 is a view showing a relation between an amount of PM deposited in the filter and a pressure difference detected by a differential pressure sensor.

FIG. 7 is a view showing a relation between the amount of PM deposition in the filter 3 and the pressure difference detected by the differential pressure sensor 14. FIG. 7 shows the pressure difference detected by the differential pressure sensor 14, in cases where the amount of PM deposition in the filter 3 increases gradually from 0. In FIG. 7, in a range indicated by "interior of partition wall", PM is trapped mainly in the interior 3B of the partition wall of the filter 3, and in a range indicated by "surface", PM is trapped mainly on the surface 3A of the partition wall of the filter 3. As shown in FIG. 7, there is a relation that the pressure difference becomes larger as the amount of PM deposition increases, and hence, if the relation shown in FIG. 7 has been obtained in advance by experiments, simulations, or the like, the amount of PM deposition can be obtained based on the detected pressure difference. Here, note that in a gasoline engine, an amount of PM discharged from the internal combustion engine 1 is relatively small. Moreover, in the gasoline engine, the temperature of exhaust gas is high, and hence PM is easily oxidized. For that reason, the amount of PM deposition changes mainly within the range of "the interior of the partition wall", as shown in FIG. 7.

Figure 8:
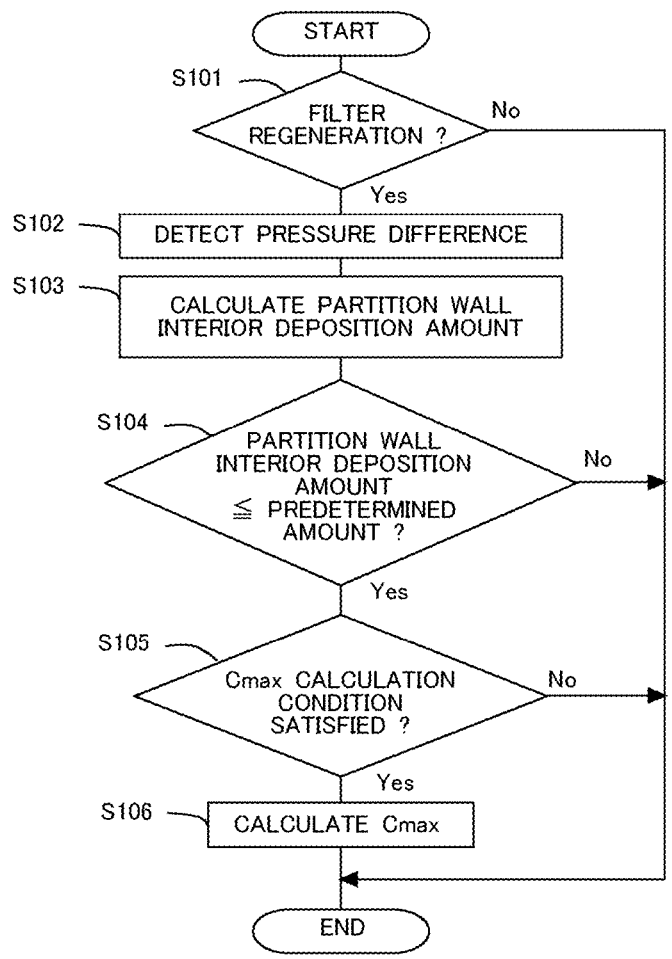
FIG. 8 is a flow chart showing a flow for calculating the maximum storable oxygen amount.

FIG. 8 is a flow chart showing a flow or routine for calculating the maximum storable oxygen amount. This routine in this flow chart is carried out by means of the ECU 10 at predetermined operation intervals. In step S101, it is determined whether the regeneration of the filter 3 has been carried out. The regeneration of the filter 3 is carried out when the temperature of the filter 3 is equal to or higher than a PM oxidation temperature (e.g., 500 degrees C.), and when the air fuel ratio of the exhaust gas is a lean air fuel ratio, or when the fuel cut-off of the internal combustion engine 1 is carried out. Accordingly, by determining whether such a state or condition has existed, it can be determined whether the regeneration of the filter 3 has been carried out. Here, note that the regeneration of the filter 3 is not limited to a case where it has been actively carried out by the ECU 10, but also includes a case where it has been carried out in the course of nature. If the regeneration of the filter 3 has not been carried out, there will be a high possibility that PM has been deposited in the interior of the partition wall of the filter 3, so the calculation of the maximum storable oxygen amount is not carried out. In addition, when a certain period of time has elapsed after the regeneration of the filter 3 is carried out, PM may be again deposited in the filter 3, and hence, in this step S101, it may be determined whether the period of time elapsed after the regeneration processing of the filter 5 is carried out is within a predetermined period of time. The predetermined period of time has been set in advance as a period of time in which even if PM has been deposited in the filter 3, the amount of the PM thus deposited does not have influence on the maximum storable oxygen amount. In cases where an affirmative determination is made in step S101, the routine of the flow chart goes to step S102, whereas in cases where a negative determination is made, this routine is ended. Here, note that in this embodiment, the ECU 10, which carries out the processing of step S101, functions as a controller in the present disclosure.

In step S102, the pressure difference is detected by the differential pressure sensor 14. Here, the pressure difference is affected by the influence of the flow rate of exhaust gas, so the pressure difference may be detected in association with the flow rate of exhaust gas. In addition, the flow rate of exhaust gas has a correlation with the amount of intake air, and hence, the pressure difference may be detected in association with the amount of intake air. Moreover, the influence of the flow rate of exhaust gas may be eliminated by detecting the pressure difference at the time of a predetermined flow rate of exhaust gas or a predetermined amount of intake air. Subsequently, in step S103, the amount of PM deposited in the interior 3B of the partition wall of the filter 3 (hereinafter, referred to as a partition wall interior deposition amount) is calculated based on the pressure difference detected in step S102. Here, note that the relation shown in FIG. 7 has been obtained in advance by experiments, simulations or the like, and stored in the ECU 10. This relation shown in FIG. 7 may have been obtained and stored for each flow rate of the exhaust gas or for each amount of intake air. Then, the ECU 10 calculates the partition wall interior deposition amount from the relation shown in FIG. 7 and the pressure difference detected in step S102.

In step S104, it is determined whether the partition wall interior deposition amount is equal to or smaller than a predetermined amount. This predetermined amount is a PM deposition amount which does not affect a calculated value of the maximum storable oxygen amount, and may be set to 0, for example. In cases where an affirmative determination is made in step S104, the routine of the flow chart goes to step S105, whereas in cases where a negative determination is made, this routine is ended. In step S105, it is determined whether a condition for calculating the maximum storable oxygen amount Cmax is satisfied. For example, when the operating state of the internal combustion engine 1 is in a state of being able to carry out active control, a determination is made that the condition is satisfied. In cases where an affirmative determination is made in step S105, the routine of the flow chart goes to step S106, whereas in cases where a negative determination is made, this routine is ended. In step S106, the maximum storable oxygen amount Cmax is calculated. The ECU 10 carries out the active control and calculates the maximum storable oxygen amount Cmax by the Cmax method. Here, note that in this embodiment, the ECU 10 functions as a controller in the present disclosure, by carrying out the processing of step S104. Also, in this embodiment, the ECU 10 functions as a controller in the present disclosure, by carrying out the processing of step S106.

Here, note that the above-mentioned step S101 can also be omitted. Even if the step S101 is omitted, in step S104, it is determined whether the partition wall interior deposition amount is equal to or smaller than the predetermined amount, and hence, the maximum storable oxygen amount Cmax is not calculated in a state where the partition wall interior deposition amount is larger than the predetermined amount. On the other hand, in cases where the ECU 10 grasps, by actively carrying out the regeneration of the filter 3, that the partition wall interior deposition amount becomes zero, the processings of steps S102 to S104 may be omitted.

Figure 9:
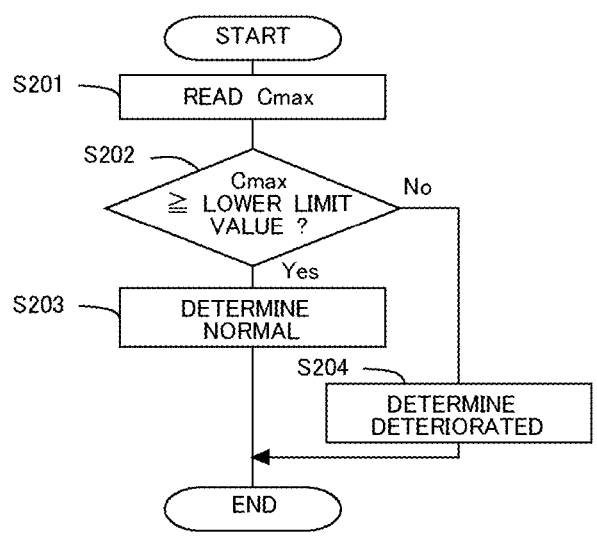
FIG. 9 is a flow chart showing a flow for the deterioration determination of the three-way catalyst.

When the maximum storable oxygen amount Cmax is calculated in step S106 in the flow chart shown in FIG. 8, the ECU 10 carries out the deterioration determination of the three-way catalyst 31. FIG. 9 is a flow chart showing a flow or routine for the deterioration determination of the three-way catalyst 31. The deterioration determination shown in FIG. 9 is carried out when the maximum storable oxygen amount Cmax is calculated according to the flow chart shown in FIG. 8. In step S201, the maximum storable oxygen amount Cmax is read, and then in step S202, it is determined whether this maximum storable oxygen amount Cmax is equal to or more than the lower limit value. This lower limit value is a lower limit value of the maximum storable oxygen amount in which the three-way catalyst 31 can be said to be normal in the state where PM is not deposited in the filter 3, and the lower limit value has been obtained in advance through experiments, simulations or the like. In cases where an affirmative determination is made in step S202, the routine goes to step S203, in which a determination is made that the three-way catalyst 31 is normal. On the other hand, in cases where a negative determination is made in step S202, the routine goes to step S204, in which a determination is made that the three-way catalyst 31 has deteriorated.

As described above, according to this embodiment, the maximum storable oxygen amount is calculated in the state where PM is not deposited in the interior 3B of the partition wall of the filter 3, so that the oxygen storage capacity of the catalyst supported by the filter 3 can be estimated with a high degree of accuracy, without being affected by the influence of PM. For this reason, at the time of the deterioration determination of the three-way catalyst 31, it is possible to suppress an incorrect determination from occurring due to the influence of PM. Accordingly, accuracy in the deterioration determination of the catalyst supported by the filter 3 can be improved.

What is claimed is:

1. An exhaust gas purification apparatus for an internal combustion engine comprising:
a particulate filter that is arranged in an exhaust passage of the internal combustion engine, and supports a catalyst having an oxygen storage capacity;
an air fuel ratio sensor configured to detect an air fuel ratio of exhaust gas at the downstream side of said particulate filter; and
a controller configured to:
change an air fuel ratio of exhaust gas flowing into said particulate filter,
determine whether an amount of particulate matter deposited in an interior of a partition wall of said particulate filter is equal to or smaller than a predetermined amount, and
estimate a maximum storable oxygen amount of said catalyst from a change of the air fuel ratio of exhaust gas obtained by said air fuel ratio sensor at the time when the air fuel ratio of the exhaust gas is changed by said controller, in cases where the amount of particulate matter deposited in the interior of the partition wall of said particulate filter is equal to or smaller than the predetermined amount,
wherein
in response to the amount of the particulate matter deposited in the interior of the partition wall of said particulate filter being greater than the predetermined amount, the controller is configured to not estimate the maximum storable oxygen amount of said catalyst from the change of the air fuel ratio of exhaust gas obtained by said air fuel ratio sensor at the time when the air fuel ratio of the exhaust gas is changed by said controller.

2. An exhaust gas purification apparatus for an internal combustion engine comprising:
a particulate filter that is arranged in an exhaust passage of the internal combustion engine, and supports a catalyst having an oxygen storage capacity;
an air fuel ratio sensor configured to detect an air fuel ratio of exhaust gas at the downstream side of said particulate filter;
a controller configured to:
change an air fuel ratio of exhaust gas flowing into said particulate filter,
determine whether an amount of particulate matter deposited in an interior of a partition wall of said particulate filter is equal to or smaller than a predetermined amount, and
estimate a maximum storable oxygen amount of said catalyst from a change of the air fuel ratio of exhaust gas obtained by said air fuel ratio sensor at the time when the air fuel ratio of the exhaust gas is changed by said controller, in cases where the amount of particulate matter deposited in the interior of the partition wall of said particulate filter is equal to or smaller than the predetermined amount; and
a differential pressure sensor configured to detect a pressure difference between pressures of exhaust gas at an upstream side and at a downstream side of both the particulate filter and the catalyst,
wherein said controller is further configured to:
determine whether a regeneration of said particulate filter has been carried out within a predetermined period of time,
in response to determining that the regeneration of said particulate filter has been carried out within the predetermined period of time, calculate the amount of the particulate matter deposited in the interior of the partition wall of said particulate filter based on the pressure difference detected by said differential pressure sensor,
in response to determining that the calculated amount of the particulate matter deposited in the interior of the partition wall of said particulate filter is equal to or smaller than the predetermined amount, determine whether a condition for calculating the maximum storable oxygen amount of said catalyst is satisfied,
in response to determining that the condition for calculating the maximum storable oxygen amount of said catalyst is satisfied, estimate the maximum storable oxygen amount of said catalyst, and
in response to any of (i) determining that the regeneration of said particulate filter has not been carried out within the predetermined period of time, (ii) determining that the amount of the particulate matter deposited in the interior of the partition wall of said particulate filter is greater than the predetermined amount, and (iii) determining that the condition for calculating the maximum storable oxygen amount of said catalyst is not satisfied, not estimate the maximum storable oxygen amount of said catalyst.

3. The exhaust gas purification apparatus as set forth in claim 2, wherein
the predetermined period of time has been set in advance as a period of time in which even if the particulate matter has been deposited in the interior of the partition wall of said particulate filter, an amount of the particulate matter thus deposited does not have an influence on the maximum storable oxygen amount of said catalyst.

4. The exhaust gas purification apparatus as set forth in claim 2, wherein
the predetermined amount is an amount of the particulate matter deposited in the interior of the partition wall which does not affect estimation of the maximum storable oxygen amount of said catalyst.

5. The exhaust gas purification apparatus as set forth in claim 2, wherein
the condition for calculating the maximum storable oxygen amount of said catalyst being satisfied corresponds to the internal combustion engine being in an operating state of being able to carry out active control.

6. An exhaust gas purification apparatus for an internal combustion engine comprising:
a particulate filter that is arranged in an exhaust passage of the internal combustion engine, and supports a catalyst having an oxygen storage capacity;
an air fuel ratio sensor configured to detect an air fuel ratio of exhaust gas at the downstream side of said particulate filter; and
a controller configured to:
change an air fuel ratio of exhaust gas flowing into said particulate filter,
determine whether an amount of particulate matter deposited in an interior of a partition wall of said particulate filter is equal to or smaller than a predetermined amount, and
in response to determining that the amount of the particulate matter deposited in the interior of the partition wall of said particulate filter is equal to or smaller than the predetermined amount, estimate a maximum storable oxygen amount of said catalyst from a change of the air fuel ratio of exhaust gas obtained by said air fuel ratio sensor at the time when the air fuel ratio of the exhaust gas is changed by said controller.

7. The exhaust gas purification apparatus as set forth in claim 6, wherein
said controller is further configured to:
determine whether the particulate matter deposited in said particulate filter has been oxidized, and
in response to determining that the particulate matter deposited in said particulate filter has been oxidized, determine whether the amount of the particulate matter deposited in the interior of the partition wall of said particulate filter is equal to or smaller than the predetermined amount.

8. The exhaust gas purification apparatus as set forth in claim 6, further comprising:
a differential pressure sensor configured to detect a pressure difference between pressures of exhaust gas at an upstream side and at a downstream side of said particulate filter;
wherein said controller is further configured to calculate the amount of the particulate matter deposited in the interior of the partition wall of said particulate filter based on the pressure difference detected by said differential pressure sensor.

9. The exhaust gas purification apparatus as set forth in claim 6, further comprising:
a differential pressure sensor configured to detect a pressure difference between pressures of exhaust gas at (i) an upstream side of both the particulate filter and the catalyst and at (ii) a downstream side of both the particulate filter and the catalyst,
wherein said controller is further configured to calculate the amount of the particulate matter deposited in the interior of the partition wall of said particulate filter based on the pressure difference detected by said differential pressure sensor.

10. The exhaust gas purification apparatus as set forth in claim 6, wherein
in response to the amount of the particulate matter deposited in the interior of the partition wall of said particulate filter being greater than the predetermined amount, the controller is configured to not estimate the maximum storable oxygen amount of said catalyst from the change of the air fuel ratio of exhaust gas obtained by said air fuel ratio sensor at the time when the air fuel ratio of the exhaust gas is changed by said controller.

11. The exhaust gas purification apparatus as set forth in claim 6, wherein
the predetermined amount is an amount of the particulate matter deposited in the interior of the partition wall which does not affect estimation of the maximum storable oxygen amount of said catalyst.

12. The exhaust gas purification apparatus as set forth in claim 6, further comprising:
a differential pressure sensor configured to detect a pressure difference between pressures of exhaust gas at (i) an upstream side of both the particulate filter and the catalyst and at (ii) a downstream side of both the particulate filter and the catalyst,
wherein said controller is further configured to:
determine whether a regeneration of said particulate filter has been carried out within a predetermined period of time,
in response to determining that the regeneration of said particulate filter has been carried out within the predetermined period of time, calculate the amount of the particulate matter deposited in the interior of the partition wall of said particulate filter based on the pressure difference detected by said differential pressure sensor,
in response to determining that the calculated amount of the particulate matter deposited in the interior of the partition wall of said particulate filter is equal to or smaller than the predetermined amount, determine whether a condition for calculating the maximum storable oxygen amount of said catalyst is satisfied,
in response to determining that the condition for calculating the maximum storable oxygen amount of said catalyst is satisfied, estimate the maximum storable oxygen amount of said catalyst, and
in response to any of (i) determining that the regeneration of said particulate filter has not been carried out within the predetermined period of time, (ii) determining that the amount of the particulate matter deposited in the interior of the partition wall of said particulate filter is greater than the predetermined amount, and (iii) determining that the condition for calculating the maximum storable oxygen amount of said catalyst is not satisfied, not estimate the maximum storable oxygen amount of said catalyst.

13. The exhaust gas purification apparatus as set forth in claim 12, wherein
the predetermined period of time has been set in advance as a period of time in which even if the particulate matter has been deposited in the interior of the partition wall of said particulate filter, an amount of the particulate matter thus deposited does not have an influence on the maximum storable oxygen amount of said catalyst.

14. The exhaust gas purification apparatus as set forth in claim 12, wherein
the predetermined amount is an amount of the particulate matter deposited in the interior of the partition wall which does not affect estimation of the maximum storable oxygen amount of said catalyst.

15. The exhaust gas purification apparatus as set forth in claim 12, wherein
the condition for calculating the maximum storable oxygen amount of said catalyst being satisfied corresponds to the internal combustion engine being in an operating state of being able to carry out active control.

* * * * *